July 8, 1958

A. WARNICK 2,842,738

CAPACITANCE PROBE

Filed April 5, 1956

A. WARNICK
INVENTOR.

BY E. C. McRae
J. R. Faulkner
G. H. Oster

ATTORNEYS

July 8, 1958  A. WARNICK  2,842,738
CAPACITANCE PROBE
Filed April 5, 1956  2 Sheets-Sheet 2

A. WARNICK
INVENTOR.

ATTORNEYS

United States Patent Office
2,842,738
Patented July 8, 1958

2,842,738

CAPACITANCE PROBE

Alan Warnick, Detroit, Mich., assignor to Ford Motor Company, Dearborn, Mich., a corporation of Delaware Application April 5, 1956, Serial No. 576,432

6 Claims. (Cl. 324—61)

This invention relates generally to an improved capacitance probe and is more particularly concerned with a fluid cooled clearance probe for operation at elevated temperatures.

The capacitance between an electrode a distance S from a surface varies inversely with that distance S. This phenomena has been utilized to measure the run-out or the vibration of a revolving wheel or turbine blade by positioning a sensing electrode a distance from the outer periphery of the revolving element and measuring the variations in capacitance between the revolving element which is grounded and the sensing electrode which is maintained at a different potential. These variations in capacitance can be equated to variations in the distance between the sensing electrode and the revolving element and the run-out or vibrations of the element determined.

While this arrangement is generally satisfactory at lower temperatures, at temperatures in excess of 300° F. the temperature variations in the probe and its associated insulating materials cause fluctuations in the measured capacitance of such magnitudes as to mask the minute changes in capacitance caused by slight variations in the distance between the revolving element and the sensing electrode.

Attempts to cool the sensing element itself have not been made because it was thought that the charge on the sensing electrode would have a tendency to leak off through the coolant and coolant tubes and that the increased stray capacitance of a large water-cooled electrode would be objectionable. Both of these factors would tend to reduce the sensitivity of the probe.

Attempts have been made to jacket the sensing probe with a cooling system. This method, too, is ineffective at high temperatures because only the outer periphery of the insulation is effectively cooled. Therefore, there exists a large temperature gradient across the insulation and the sensing element itself remains at a high temperature.

Accordingly, one object of my invention is to provide a clearance probe in which the inner and the outer periphery of the sensing electrode insulation are cooled, thereby providing two uniform temperature boundaries on the insulation.

Another object is to provide a constant temperature surrounding for the impedance matching element which connects the sensing electrode with the measuring and detecting apparatus.

Still another object is to provide a sensing element that is electrically shrouded from its suroundings.

A further object is to provide a clearance probe which will operate effectively at elevated temperatures.

A still further object is to provide a clearance probe in which the sensing element itself is cooled in such a manner as to prevent dimensional distortion of the element at elevated temperatures. These and many other objects will become apparent upon reading the following specifications.

Referring now to the drawings in which.

Figure 1:
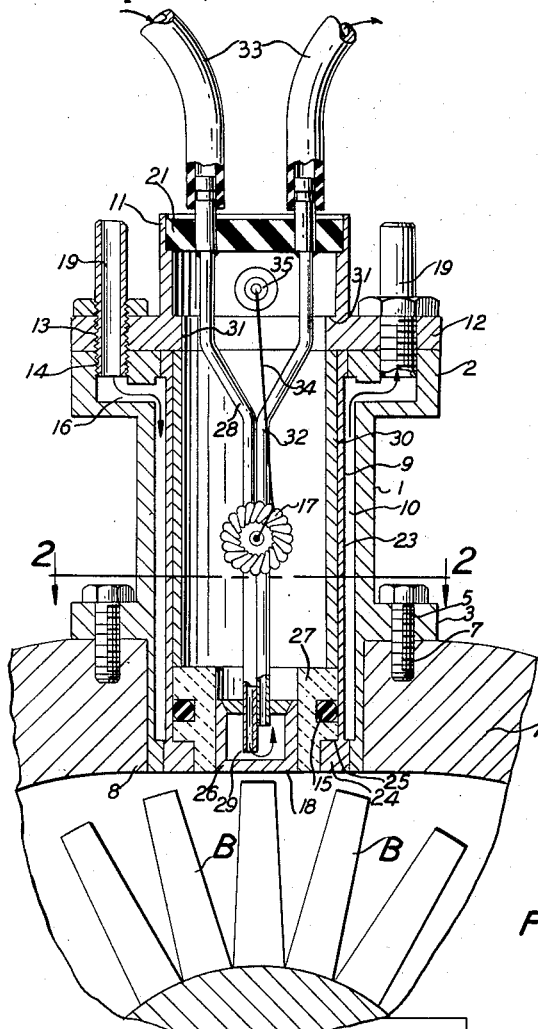
Figure 1 is a longitudinal section of my probe.
Figure 3:
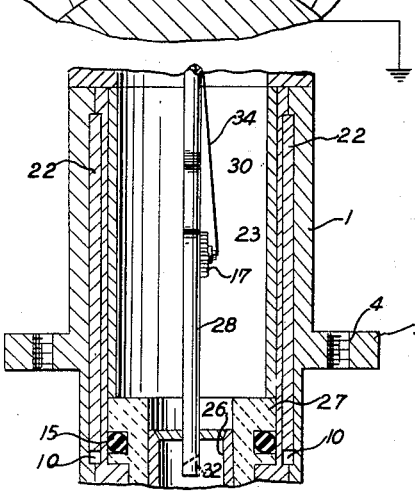
Figure 3 is a section of the probe of Figure 1 revolved 90°.
Figure 2:
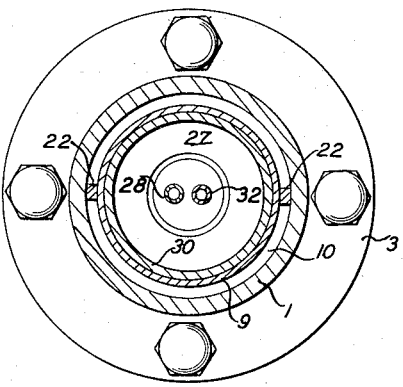
Figure 2 is a horizontal section taken along line 2—2 of Fig. 1.

Referring more particularly to Figure 1; numeral 1 designates the outer jacket of the probe which has upper lugs 2 and lower mounting flange 3. Flange 3 is provided with a series of holes 4 through which bolts 5 pass and thread into threaded holes 7 in the outer face of the turbine shroud A, thereby securing the probe in fixed relation to the shroud and the turbine blades, B. Hole 8 extends through shroud A and is reamed to the proper size to receive the lower portion of the probe. Inner concentric cylinder 9 fits within the jacket 1 and is soldered at its upper and lower ends to the inner portion of jacket 1. Intermediate its ends cylinder 9 has reduced portion 23 which, in conjunction with jacket 1, forms an annular recess 10. Baffle elements 22 (see Figures 2 and 3) are located in this recess diametrically opposite each other and 90° from the lugs 2. These baffles extend from the top of annular recess 10 to within a short distance of the bottom thereby forming a fluid passageway for the coolant. The baffles may be formed integral with the inner cylinder to fit snugly against the outer jacket or they may be merely wires of proper gage soldered in position in the recess 10. The cylinder 9 has internal flange 24 at its lower end which is adapted to receive the stepped portion 25 of annular insulation 27 which surrounds the sensing electrode 26. The sensing electrode will be more fully described below. O ring 15 is provided between the insulation and cylinder 9 to insure a good seal between the two. Inner sleeve 30 slides within cylinder 9 behind insulation 27 to seat it firmly onto flange 24. Sleeve 30 is, in turn, held in place by inner flange 31 of upper closure 11. This closure has also two external projections 12 which abut the upper face of lugs 2 on jacket 1. Internally threaded holes 13 in the closure coincide with internally threaded holes 14 in lugs 2. The closure element is securely held in position by threaded connectors 19 which also perform the function of providing a fluid inlet and outlet and together with horizontal connecting passages 16 in lugs 2 and passageway 10 form a coolant flow path in the outer jacket.

Returning now to electrode 26, it will be seen that it is generally cylindrical in shape having lower active face 18 which functions as one plate of the capacitor formed by the blade and the sensing electrode. Chamber 29 within the electrode allows the cooling liquid to flow close to the face 18 and the inner portion of insulation 27 for more effective cooling of these elements. Electrode 26 is held in place within the insulation 27 by suitable cement. The lower face 18 of the electrode and of the insulation must be shaped to conform to the inner contour of the shroud in order that gas flow within the shroud will be unimpeded and that the sensing electrode-turbine blade distance will be equal to the shroud-blade distance. To accomplish this, I allow the sensing electrode and its insulation to protrude a short distance into the interior of the turbine when the probe is originally installed, then I remove a portion of the electrode and insulation to conform to the inner contour of the shroud. It is to be noted that when the probe is at final dimensions the sensing electrode is effectively shielded from the shroud by the lower portions of jacket 1 and cylinder 9.

Thus, the electrode will not sense any metal in the shroud and the stray capacitance will remain at a fixed value. Coolant inlet tube 28 extends from close to the bottom of chamber 29, through the rear wall of the sensing electrode, longitudinally through the probe and through end support 21 mounted in the rear of upper closure 11. This end support may be of any insulating material. Outlet tube 32 extends through the rear wall of the sensing electrode and through end support 40 in much the same manner as tube 28. Notice however, that this tube does not pass as far into chamber 29 as does tube 28. As a result of this arrangement, any coolant flowing through the inlet tube must flow down to the bottom of chamber 29 and thence up to the outlet, thus the fluid more effectively cools the probe. The tubes 28 and 32 are sealed suitably to end support 21 and the rear of electrode 26. In the embodiment as shown in Figure 1 the coolant tubes 28 and 32 are constructed of metal. Therefore the extensions 33 of these tubes will preferably be several feet of insulating material to prevent any charge from leaking off the sensing electrode. The coolant tubes, being made of metal, may also serve as an electrical connection between the sensing electrode and the impedance matching element 17. The impedance matching element is required to match the relatively high probe impedance to the low impedance of the cable connecting the probe and the associated electronic equipment. This element may be any conventional design. I have used a toroidal transformer in which the high impedance winding is connected to the sensing probe and the low impedance winding is connected to output cable 34 which leads from the impedance matching transformer through hole 35 in the wall of closure 11, to the eletronic equipment (not shown).

Figure 5:
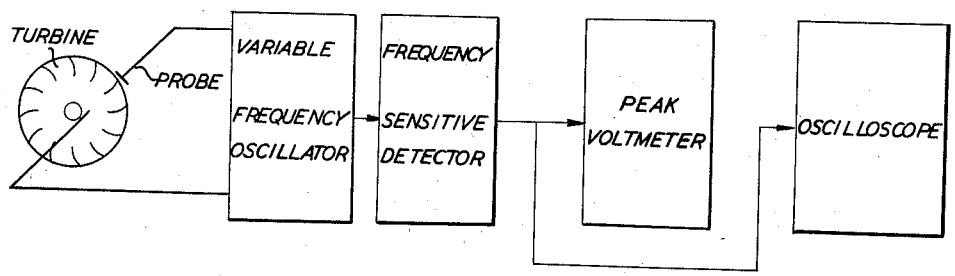
Figure 5 is a block diagram of the associated electronic circuit.

Inasmuch as the measuring, detecting and recording apparatus does not form part of this invention I have not shown it in detail. However it may be a bridge type circuit, an amplitude modulated circuit, or a frequency modulated circuit. A typical circuit is shown in the May 1953 issue of Electronics at page 147. Figure 5 shows a block diagram of a suitable frequency modulated system and is self explanatory.

An important feature of this invention resides in the fact that the impedance matching element is within the region maintained at constant temperature by the coolant flowing in passageway 10, therefore the electrical characteristics of the element remain constant when the probe is used at various temperatures.

Figure 4:
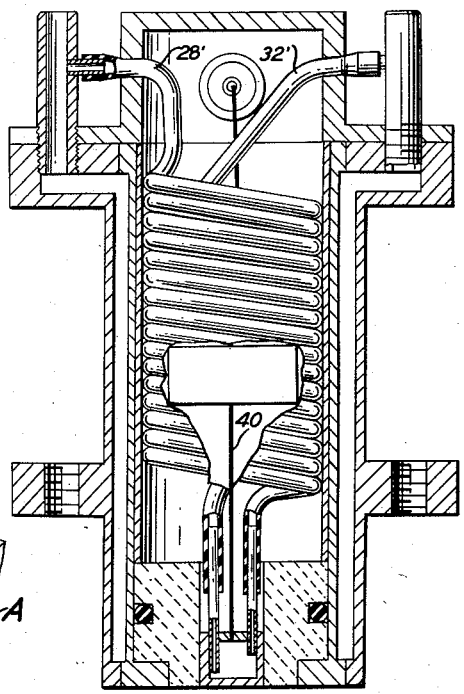
Figure 4 is a longitudinal section of another embodiment of my invention.

Figure 4 shows another embodiment of my invention in which insulating tubing 28' and 32' is used in place of metal tubes 28 and 32. By coiling this tubing it is possible to position a long length of insulated tubing within the probe thereby making it possible to use metal external tubing which might better stand the high ambient temperatures in the vicinity of this turbine. Of course, in this embodiment the impedance matchng device must be coupled to the sensing electrode through a separate conductor such as wire 40.

In operation my probe functions in the following manner. The turbine blade B is set in motion. As the successive blades move directly opposite the electrode, the capacitance between the blade and the electrode reaches a maximum. The variations in capacitance are converted into corresponding voltage changes which are viewed on an oscilloscope and the fluctuations equated to variations in the distance between the probe and the blade. The water or oil coolant flowing through passageway 10, 16 and 19 serves to cool the outer periphery of insulation 27 and to maintain the impedance matching element in a constant temperature environment. The coolant flowing in the path defined by passages 28 and 29 keeps temperature of the electrode face constant and sets an inner constant temperature zone on insulation 27 thereby eliminating any errors due to temperature variations in the probe.

Having thus fully described my invention, I claim:

1. A high temperature capacitance clearance probe comprising; an electrode housing having an inner wall and an outer wall, an annular coolant passage between said walls extending substantially the entire length of the housing, a sensing electrode having an inner coolant chamber and an active face disposed within said housing in such a manner as to enable said active face to sense metal adjacent the lower end of the probe, annular insulation means disposed about said electrode and releasably secured within said housing, a second coolant passage comprising an inlet tube leading to said inner coolant chamber and an outlet tube leading from said inner coolant chamber whereby the active face and the inner periphery of said insulation means are maintained at constant temperature by coolant flowing in the passage.

2. A high temperature capacitance clearance probe comprising; an electrode housing having an inner and an outer wall, an annular coolant passage within said walls extending substantially the entire length of the housing, a sensing electrode having an inner coolant chamber and an active face disposed within said housing in such a manner as to enable said active face to sense metal adjacent the lower end of the probe and at the same time to shield the active face from metal adjacent the sides of the probe, annular insulation means disposed about said electrode and releasably secured within said housing, a second coolant passage comprising an inlet leading to said inner coolant chamber and an outlet leading from said inner coolant chamber whereby the active face and the inner periphery of said insulation means may be maintained at constant temperature by flowing suitable coolant in said second passage.

3. A high temperature capacitance clearance probe comprising; an electrode housing having an inner wall and an outer wall, an annular coolant passage between said walls extending substantially the entire length of the housing, a sensing electrode having an inner coolant chamber and an active face disposed within said housing, annular insulation means about said electrode and releasably secured within said housing, an impedance matching device connecting said electrode with external electronic circuitry, said impedance matching device disposed within said housing in a space maintained at constant temperature by coolant flowing within said annular coolant passage, a second coolant passage permitting coolant to flow through said inner coolant chamber and thereby cooling the inner surface of said insulation means and said active face of the electrode.

4. A high temperature capacitance clearance probe comprising; an electrode housing open at the lower end of said housing, having an inner wall and an outer wall, an annular coolant passage between said walls, a sensing electrode having an inner coolant chamber and an active face disposed within said housing, an annular insulation means disposed about said electrode and releasably secured within the lower end of said housing, a second coolant passage comprising an inlet tube and an outlet tube forming a continuous coolant path through said inner coolant chamber, both said inlet and said outlet being insulating material of sufficient length to prevent any charge on the electrode from leaking to ground.

5. A high temperature capacitance clearance probe comprising; an electrode housing open at its lower end, said housing having an inner and an outer wall, an annular coolant passage between said walls, a sensing electrode having an inner coolant chamber and a lower active face disposed within said housing, an impedance matching device disposed within said housing intermediate the ends of said housing to couple said impedance matching device to external electronic circuitry, a second coolant passage comprising an inlet tube leading to the lower portion of said coolant chamber and an outlet tube leading from the upper portion of said coolant chamber, at least one of said tubes providing an electrical connection between the sensing electrode and said impedance matching device, and annular insulation means surrounding said sensing electrode and releasably secured within the lower end of said housing.

6. A high temperature capacitance clearance probe comprising, an electrode housing having an opening therein, said housing having an inner wall and an outer wall, said outer wall being spaced from said inner wall thereby forming a coolant passage therebetween, a sensing electrode disposed within the opening in the housing, said sensing electrode having an inner coolant chamber positioned therein and an active face, an insulation member disposed about said electrode and contacting said electrode and said housing, inlet and outlet means connected to the inner coolant chamber of said sensing electrode whereby coolant may be circulated through the inner coolant chamber to maintain the active face of said sensing electrode and the portion of the insulating member contacting said electrode at a constant temperature.

References Cited in the file of this patent

UNITED STATES PATENTS

| | | |
|---|---|---|
| 2,439,047 | Grinstead et al | Apr. 6, 1948 |
| 2,599,583 | Robinson et al. | June 10, 1952 |